April 19, 1966 S. FORBES 3,247,090
ELECTROLYTIC CELL
Filed Sept. 17, 1962 7 Sheets-Sheet 2

INVENTOR.
SYDNEY FORBES
BY Oscar L. Spencer
ATTORNEY

April 19, 1966  S. FORBES  3,247,090
ELECTROLYTIC CELL
Filed Sept. 17, 1962  7 Sheets-Sheet 3

INVENTOR.
SYDNEY FORBES
BY Oscar L. Spencer
ATTORNEY

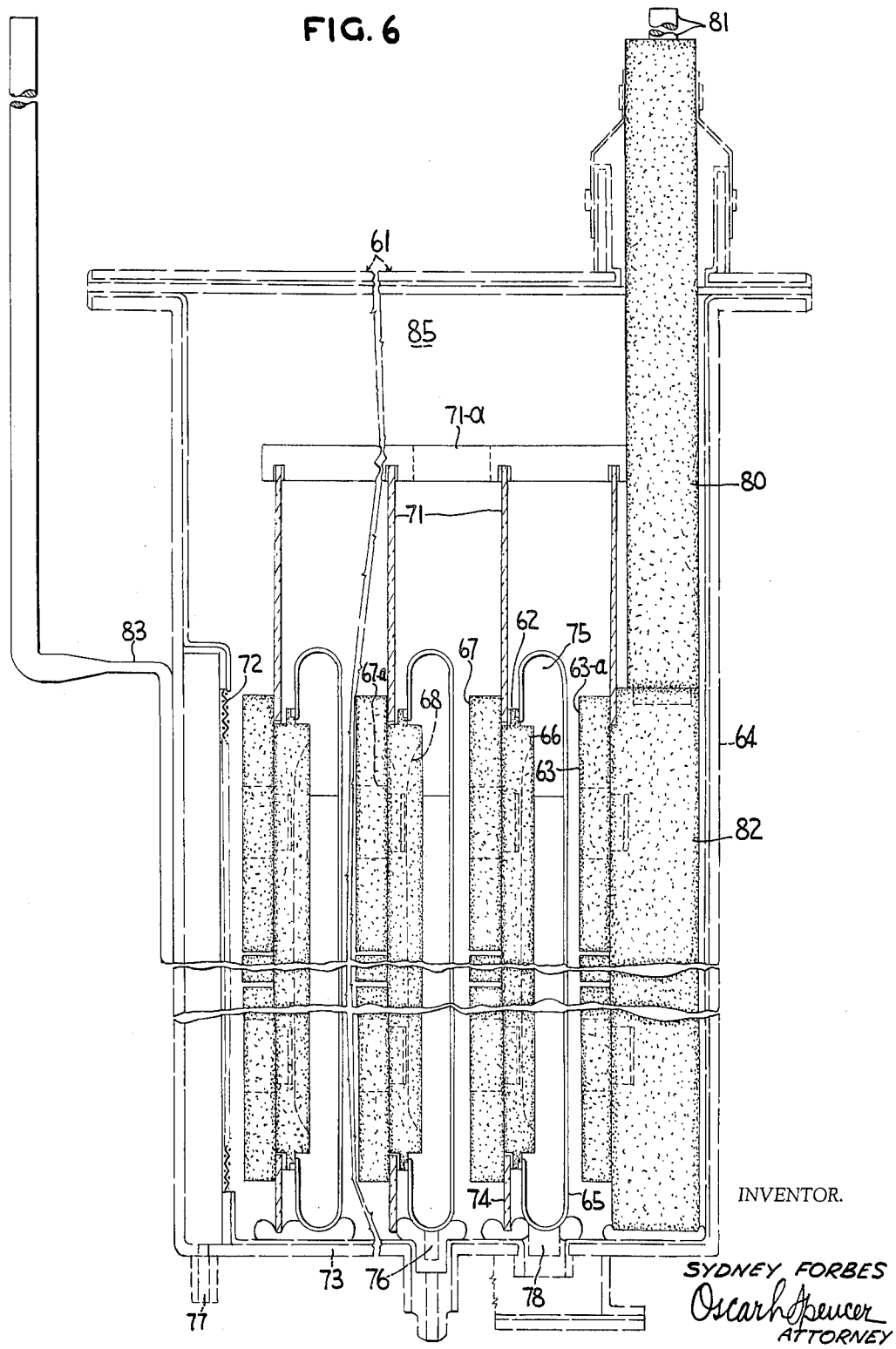

April 19, 1966

S. FORBES 3,247,090

ELECTROLYTIC CELL

Filed Sept. 17, 1962

INVENTOR.
SYDNEY FORBES
BY
Oscar H. Spencer
ATTORNEY

April 19, 1966  S. FORBES  3,247,090
ELECTROLYTIC CELL
Filed Sept. 17, 1962  7 Sheets-Sheet 6

INVENTOR.
SYDNEY FORBES
BY
Oscar H Spencer
ATTORNEY

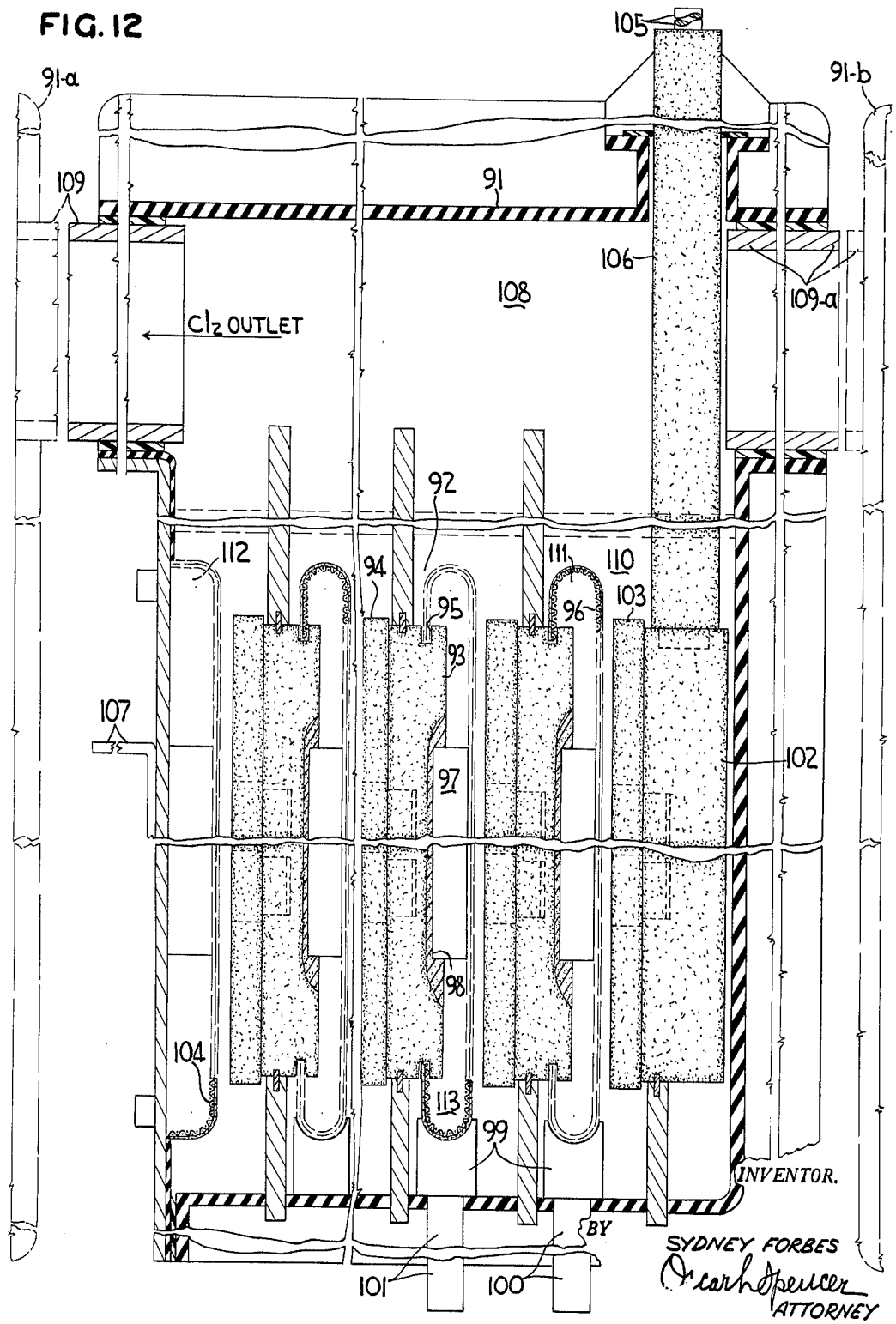

United States Patent Office 3,247,090
Patented Apr. 19, 1966

3,247,090
ELECTROLYTIC CELL
Sydney Forbes, Pittsburgh, Pa., assignor to Pittsburgh Plate Glass Company, Pittsburgh, Pa., a corporation of Pennsylvania
Filed Sept. 17, 1962, Ser. No. 224,890
4 Claims. (Cl. 204—256)

This application is a continuation-in-part of my co-pending application Serial No. 848,430, filed October 23, 1959, now abandoned.

The present invention relates to alkali-chlorine cells for the electrolysis of alkali metal chloride brines and more particularly to improvements in alkali-chlorine cells of the diaphragm type.

Electrolytic cells of the diaphragm type such as exemplified in U.S. Patent 1,866,065, granted July 5, 1932, are utilized extensively in the chlorine industry for the production of chlorine and caustic soda from aqueous brine solutions. Briefly, diaphragm cells of this type are concrete, box-like structures, having sides, top and bottom members, having positioned therein carbon or graphite anodes. Interspersed between the anode members are hollow, interconnected, finger-like projections composed of a wire screen, having impregnated or positioned thereon an asbestos diaphragm. The arrangements of the anodes and cathodes is such that there is provided two separate chambers within the cell—an anolyte compartment or chamber and a catholyte compartment or chamber.

There is a trend in industry today among manufacturers utilizing electrolytic cells of the diaphragm type to increase circuit amperages and cell sizes. This results in a concurrent increase in cell productivity. This increase in cell current capacity and productivity however presents many problems seriously interfering with cell operation. Thus, for example, diaphragm cells have now become so large that alignment of anodes and cathodes during and after assembly is seriously affecting cell operations and current efficiencies. Increased facilities for diaphragm pulling are becoming a necessity in expanding cell operations. In addition, due to the increased size of the cells, poor alignment of the anodes and cathodes often results. Another consequence of increased cell sizes is the formation of increased current paths and increased resistance to current flow through the cells. These latter two conditions greatly increase the kilowatt hours required to produce a given quantity of chlorine by electrolytically disassociating brine.

According to the present invention, a novel cell assembly is provided for diaphragm type electrolytic cell operations which eliminates or greatly minimizes many of the hereinabove referred to problems encountered in scaling up present day diaphragm type electrolytic cells for increased productivity. Thus, by virtue of the novel cell design of the present invention, an extremely short mean current path is provided in a diaphragm type electrolytic cell to thereby permit the cell to operate at high current density and low current amperage. A considerable reduction in floor space required to produce a given quantity of chlorine from a given quantity of brine is effectively achieved. Provision is made for a more uniform alignment of anode and cathode members. Piping connections are minimized to a considerable extent and substantial savings in electrical bus connections are achieved. The simplicity of design and relatively small number of electrical connections contribute to substantial reduction in cell voltage requirements when compared with conventional diaphragm type electrolytic cells and gives rise to substantial reductions in power consumption.

Thus, the present invention provides a compact electrolytic diaphragm cell which essentially is composed of a housing having side walls and provided with a top and a bottom. An anode is positioned on the inner surface of one of said side walls of the housing and a cathode on the inner surface of another side wall. The active faces of the anode and cathode are placed in opposition to each other. The anode and cathode members positioned on the inner surface of the side walls of the housing are relatively flat structures usually rectangular or square in shape and are so positioned that they are parallel with each other along their active faces, and thus, in direct alignment with each other. The anode and cathode members thus when positioned on the housing side walls face each other with the anode and cathode flat active faces being paralleled with respect to each other.

Within the housing, there is placed one or more electrolytic cell units. These units are chambers enclosed by side walls and provided with top and bottom members. Each unit possesses an anodic outer surface on one of its side walls and a cathodic outer surface on a second side wall. The anodic and cathodic outer surfaces are relatively flat surfaces, usually square or rectangular in shape, and are so placed within the cell unit that the anodic outer surface of one side wall is paralleled with the cathodic surface of the cell housing, or the cathodic outer surface of an adjacent electrolytic cell unit. Similarly, the cathodic outer surface of the cell unit is paralleled with the anode surface positioned on the side wall of the housing or with an adjacent anodic outer surface of an adjacent electrolytic cell unit. Thus, the side walls with the anodic and cathodic outer surfaces are positioned directly opposite each other and in position in the housing the flat anodic surface or face of a cell unit faces the cathode member of the housing while the cathodic surface of the same cell unit faces the anode member of the housing. Using a plurality of these units provides a multiplicity of anodes and cathodes in the housing in sequential arrangement of anode and cathode beginning with the housing anode and ending with the housing cathode. Thus, as will be readily apparent from this arrangement, there is provided within the confines of the housing a sequential arrangement of a plurality of substantially flat active cathode and anode surfaces positioned opposite each other and paralleled to each other at their active faces across the cell housing.

The advantages obtainable by virtue of the novel cell assembly of the instant invention will be more readily understood by reference to the accompanying drawings in which:

FIG. 6 is a cross-section of a cell assembly showing another embodiment of cell units positioned within a cell housing.

As seen from the accompanying drawing, the novel cell assembly is composed of a multitude of parts arranged in such a manner so as to provide the hereinabove enumerated advantages during cell operation. The current path through the housing is essentially a straight line.

Figure 1:
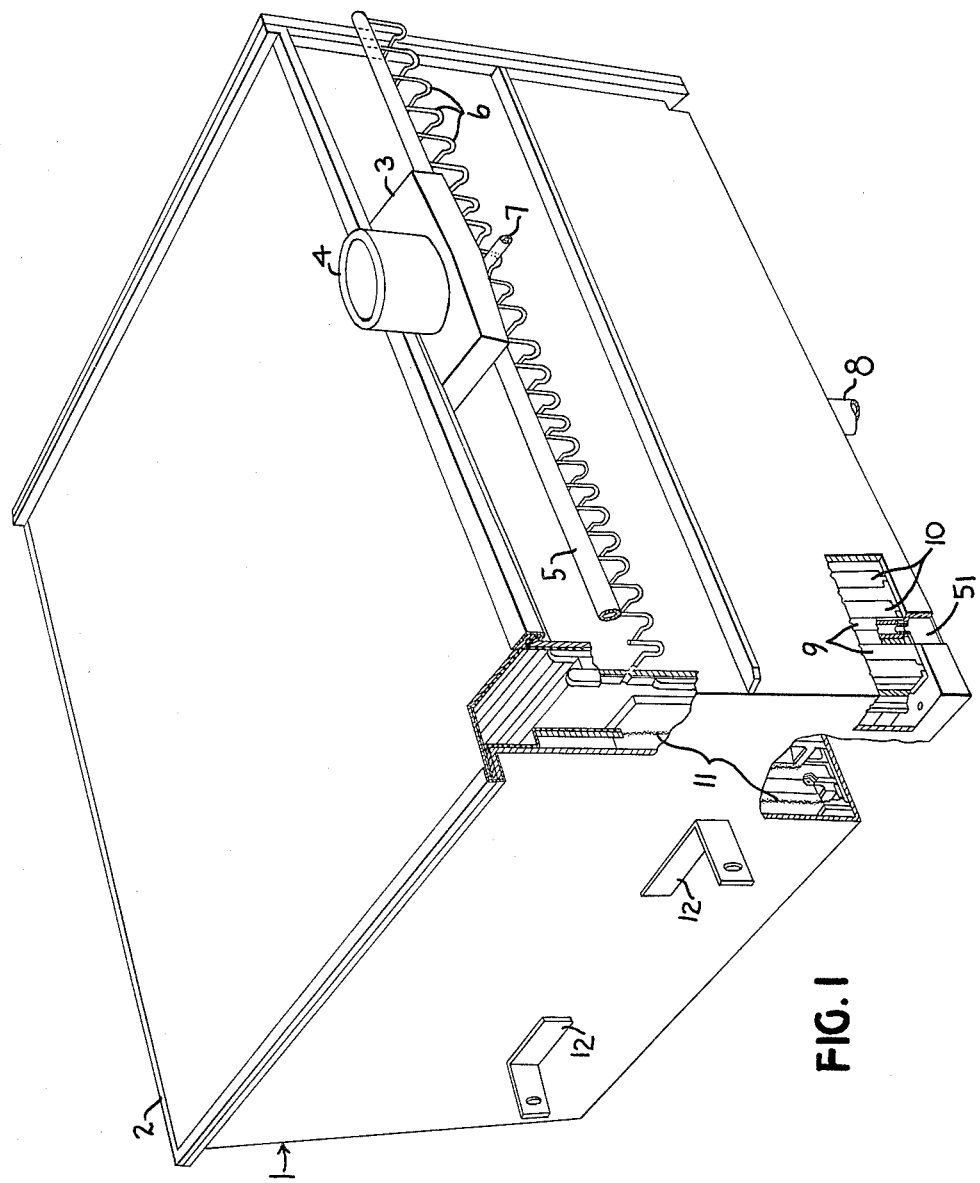
FIG. 1 represents a perspective view in elevation of a cell assembly partially broken away to show the internal arrangement of cell units within the housing.
Figure 2:
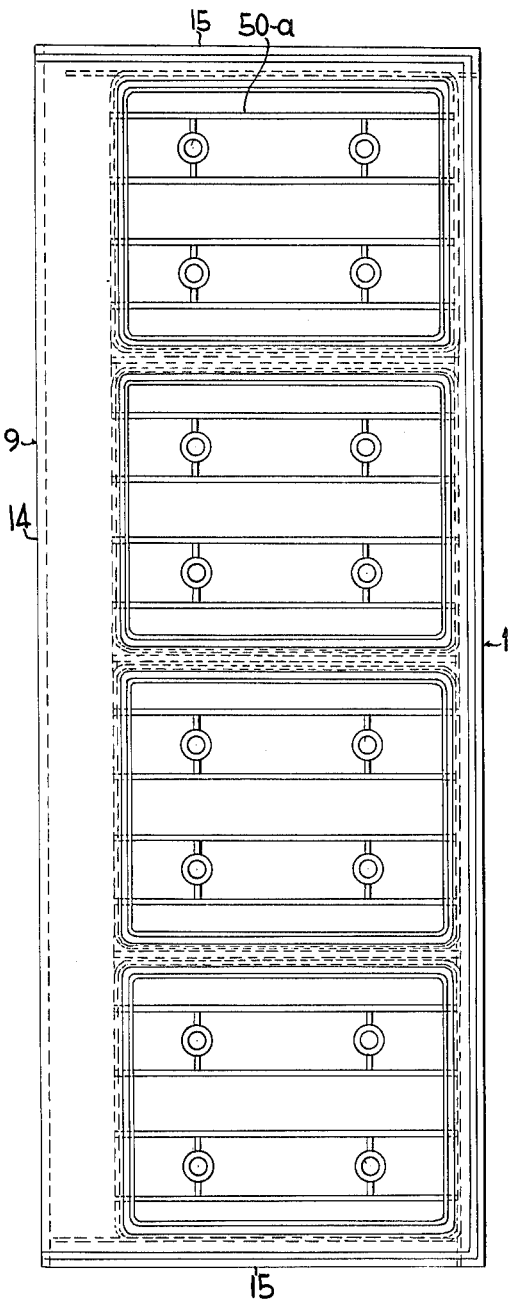
FIG. 2 is a front elevation of one embodiment of the cell units used in the cell housing of FIG. 1 and showing the anodic surface of the cell unit.

Turning to the drawing with particular reference to FIGURES 1 and 2, there is shown a container or housing generally indicated at 1, having positioned thereon a cover member 2. A duct 3 is provided on one wall of the container 1 and is positioned to adjacent cover member. Duct 3 is in communication with the interior of container 1 and is provided on its upper, outer surface with a conduit 4. Duct 3 and conduit 4 serve as a product discharge means for gases such as chlorine liberated at the cell anodes during cell operation. Positioned on one side of the container 1, below duct 3, is a header 5 closed at both ends and provided with a plurality of tapped feed lines 6. The header 5 is also provided with an inlet feed line 7. Brine feed to cell units positioned in container 1 is accomplished by introducing the brine by conduit 7 to the header 5 and from header 5 distribution of brine to the cell units is provided through inlet lines 6. On the bottom of the housing 1 is located a discharge conduit 8 which serves as the discharge opening for hydrogen or other gas produced at the cathodes during cell operation.

As can be readily seen from FIG. 1, there are positioned in container 1 a plurality of cell units 9. Between units 9 a plurality of spacing members 10 are placed to provide a proper and uniformed distance between anode and cathode members positioned on units 9 as will be hereinafter more fully explained. In addition to cell units 9, a cathode screen 11 is shown attached to the wall of container 1 on its inner surface. The cathode, screen 11, is spaced from the wall of the housing 1 and is essentially a flat surface screen which has its flat inner surface paralleled with the flat side wall of the housing 1. The outer active surface of the screen is paralleled with the active anode face of the cell unit positioned adjacent the wall of the housing. On the outer surface of the wall of housing 1 which has attached thereto the cathode screen 11, there is positioned copper bus connectors 12. The spacing arrangement shown in FIG. 1 is continuous across the housing or container 1 with the wall opposite the cathode containing wall having positioned on its inner surface an anode member which like cathode screen 11 is a flat plate of graphite which is attached to the wall of the housing and has its flat active surface in parallel with the wall of the housing 1.

The cathode screen 11 is a metal screen constructed of a suitable structural material, such as steel. The screen 11 is based from the inner surface of the wall of housing 1 and is provided with connections to the wall at the bottom and the top to define a hollow chamber—one wall of which is formed by the wall of container 1. The screen is generally rectangular or square in shape and is parallel to the inner surface of the wall of container 1 to which it is connected. The outer surface of the screen 11, as is readily seen from the examination of FIG. 1, is in parallel with a flat active anode which is positioned in direct alignment with the cathode screen.

As will be readily apparent, construction and arrangement of the cathode member is such that a relatively flat surface is provided for the diaphragm which is associated with the cathode screen. While diaphragms utilized on cathode members may be pulled in a conventional manner by the use of suction from an asbestos slurry, the flat surface of the cathode screen permits the use of diaphragm paper in cells of the type herein contemplated. Utilization of diaphragm papers instead of pulled diaphragms will allow for much more uniformity among the various diaphragms contained within any one particular cell assembly. Attachment of the diaphragm to the screen cathode is accomplished by any suitable mechanical means such as gluing, mechanical mounting clips, and the like. In addition, if a pulled diaphragm is desired, the screen is merely immersed in an asbestos slurry of desired consistency from which the diaphragm is pulled on to the cathode screen by means of a vacuum applied from inside of the cathode compartment.

Figure 4:
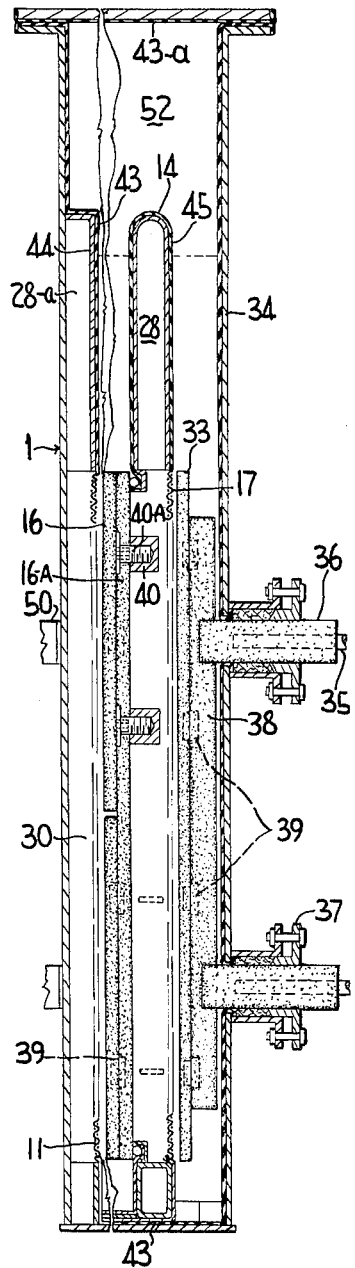
FIG. 4 is a cross-section of a cell housing having one cell unit positioned therein and showing the anode current feed.
Figure 3:
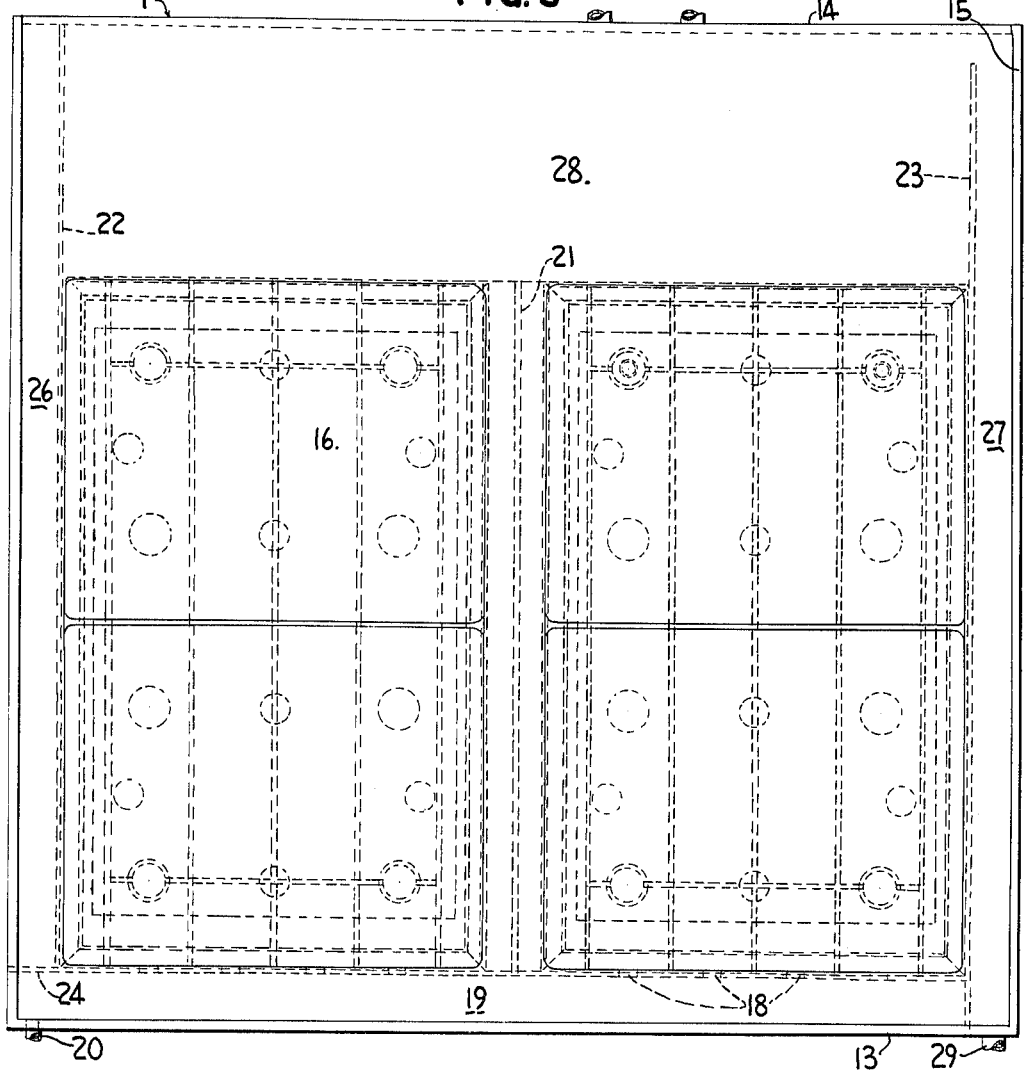
FIG. 3 is a front elevation of another embodiment of a cell unit for use in the cell housing of FIG. 1 showing the anodic surface of the cell unit.
Figure 5:
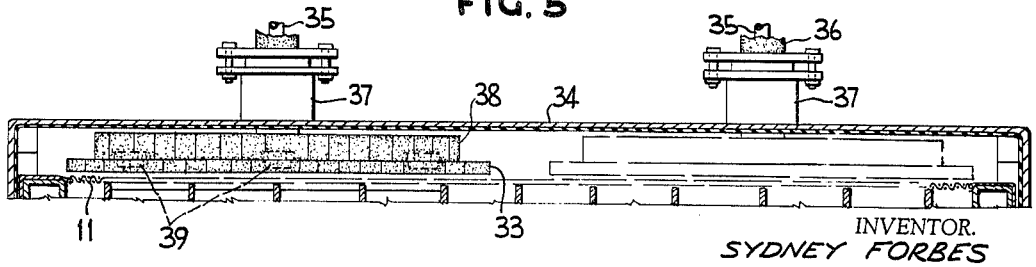
FIG. 5 is a top view of a cell assembly with the cell cover removed showing the cell anode and the cathode screen of an adjacent cell unit.

Referring now to FIGS. 2, 3, and 4, the cell units employed in the novel electrolytic cell of the present invention are described in more detail. As shown in FIGS. 2, 3 and 4, cell units 9 are enclosed chambers. Each chamber is provided with an anodic outer wall 16 and a cathiodic outer wall 17, two side walls 15, a bottom member 13 and a top member 14. The anodic outer surface 16 of the cell unit is preferably attached to a non-consumable graphite surface 16–A which surface forms one of the inner walls of the cell unit. Bottom member 13 and top member 14 are preferably constructed of an insulated structural material such as rubber covered steel. The hollow chamber formed by the above wall members is further sub-divided into compartments by spacing means 21, 22 and 23. These spacing means may be conveniently machined flat elongated plates attached to their sides to the cathodic wall on the one hand and to the structural frame on which the non-consumable graphite is mounted on the other hand and secured on the bottom by elongated horizontally disposed plate 24 attached to the anodic and cathodic walls. Plate 21 rises from its attachment to plate 24 to a point parallel with the upper horizontal surface of the cell anode 25 positioned on the anodic wall. Plate 22 is positioned or attached to steel plate 24 at the bottom and to the top 14 of the cell unit. Plate 23 is attached at its bottom to the bottom 13 of the cell unit, its top uppermost extremity terminates slightly below the surface of the top member 14.

This arrangement of flat elongated plate members within the chambers comprising cell units 9 provides a series of passages and chambers within the cell unit. Thus, plate 24 and plate 23 cooperate with bottom member 13 of the cell unit to provide a passage 19. Plate 22, together with plate 24 and top member 14, form an enclosed chamber 26 on one side of the cell unit. Plate 23 and side 15 and top member 14 combine in a cooperative relationship to provide a passage 27 which communicates with a chamber 28 located above the level of the upper surface of the cell anode 16. Two outlets, 20 and 29, are provided on the bottom 13 of the cell unit. Outlet 20 communicates with passage 19 while outlet 29 communicates with passage 27.

A plurality of openings are formed in plate 24 between the chamber 30 formed by the cooperative relationship of plates 24, 23, and 21, on the one hand, and the cell anodes and the cathodes on the other hand. During operation of the cells, cell liquor from the chamber 30 passes from the chamber through outlet 18 to passage 19 and flows along passage 19 and out of the cell unit through outlet 20. Hydrogen evolved at the cathode screen rises in chamber 30 to gas space 28 and from gas space 28 is removed from the cell through passage 27 and opening 29. This hydrogen removal may be easily accomplished by providing a small vacuum on the system through outlet 29.

Referring more particularly to FIG. 4, graphite backing means 38 is secured to the cell anode 33 and may be moved in a horizontal direction by movement of the graphite rod 36 which is embedded in the backing means 38. Backing means 38 is conveniently constructed of a non-consumable graphite surface which is preferably a graphite which is impervious to anolyte or catholyte. Typical of graphites contemplated are phenolic, epoxy or wax-treated graphite. Movement of the graphite rod 36 in either direction will adjust the anode 33 with respect to the cathode screen 17 of the cell unit 9 so that at all times a uniform gap between the anode 33 and the cathode 17 is maintained. Of course, as will be readily understood, similar spacing may be accomplished between each individual cell unit contained within a container or housing by selecting spacing means between each unit of a given size. Thus, during the operation of such cell assembly as consumption of the graphite anodes takes place, adjustments may be made and the spacing means employed between each individual cell unit within the housing and between the anode on the interior surface of the housing itself and the first cell unit to maintain a uniform gap between any adjacent anode and cathode member.

The embodiment shown in FIG. 4 illustrates a container identical to the housing of FIG. 1 but containing only a single cell unit 9 disposed therein. As is readily seen, a graphite anode 33 is placed in parallel relationship on its flat active surface to a wall 34 of container 1. A copper connection 35 embedded in the graphite rod communicates through stuffing box 37 with a graphite backing plate 38 located between the consumable anode 33 and the wall 34. The electrical connection between the graphite backing means 38 and the graphite anode blade 33 is made through a series of conductive plugs or bolts 39 such as graphite. Cell unit 9 positioned within the container 1 is placed so that the cathode screen 17 of the cell unit is in parallel position to the graphite anode 33 of the container. Both the cathode screen and the anode 33 are flat rectangular structures which are parallel to each other at their active surfaces. Directly opposite the cathode 17 of the cell unit is positioned, on the interior of the cell unit, the anode backing plate 16-A. Secured to the anode backing plate 16-A is the cell anode 16 which faces the cathode screen 11 of the cell housing. The anode backing plate 16-A and the anode are electrically connected in the same manner that backing plate 38 is connected to the housing anode 33, that is, by means of electrically conductive plugs, such as graphite plug 39. The graphite backing plate 16-A of the cell unit is suitably secured on the unit by means of drilled and tapped metal conductors 40 and plugs 40-A. The cell unit 9 in position in the cell is so placed that the anode 16 of the cell unit faces the cathode 11 and the container 1. An insulating lining 43-a is placed on the inner surface of the cover member of the cell housing and the inner wall surfaces of the cell housing which form the anolyte compartment of the assembled cell. A similar lining 43 constructed of a suitable insulating material such as rubber or plastic resins, rubber-covered cloth and other like material is positioned on the outer surface of the side member 44 of the catholyte compartment formed on the wall of the housing 1. A similar lining 45 is positioned on the cathode cover member 14 of the cell unit 9 disposed within the housing 1. Rubber makes a particularly effective insulating lining both natural rubber and synthetic rubbers being equally effective. These linings effectively insulate the anode of the housing from the cathode of the housing. Copper bus connectors 50 are affixed to the wall of container 1 having the cathode screen attached thereto. As is best seen in FIG. 2, each cell unit has positioned therein between the anode and the cathode screen a series of metal stiffeners 50-a which are utilized to hold the cathode screen in a rigid position and to conduct current from the cathode screen to the anode of the cell unit.

In operation of an electrolytic cell assembly constructed in accordance with the embodiment shown in FIGURES 1, 2, 3 and 4, cell brine is introduced through inlet 7, header 5, and feed inlet 6 to a container 1 having placed therein a plurality of cell units 9 and containing in addition the cathode member 11 affixed in parallel relationship to one wall of the cell housing and an anode member positioned in parallel relationship with another wall surface directly opposite said cathode member. The cell units are positioned so that the anodic outer wall surface of a cell unit faces the cathode screen of the container and the cathodic outer wall surface of the unit faces the anode wall of container 1. The active flat surfaces of all the anodic and cathodic surfaces contained in the assembled cell are in parallel relationship with respect to each other.

The cell is energized by passing a current through copper rod 35, graphite rod 36, back-up plate 38, plugs 39, cell anode 33 through the electrolyte located between the anode 33 and the cathode 17 of the cell unit 9. Current passes through the cell unit 9 by way of steel stiffeners 50-a, conductors 40, plugs 40-a, back-up 16-A and plugs 39 to the anode 16. Current from the anode 16 of the cell unit passes through the electrolyte between the anode 16 and the cathode 11 and is removed from the housing through bus connector 50 to the next adjacent cell assembly. As brine is introduced to the container, electrolysis occurs at the anodes 16 of the cell units 9 and the anode 33 of the container 1. Chlorine evolved during electrolysis rises to a gas space 52 (FIG. 4) located beneath the surface of the cover member 2 of the container 1 and is removed from the container through duct 3 and chlorine outlet 4. The cell liquor percolates or flows through the cathode 17 of the cell unit 9 which contains on its outer surface an asbestos diaphragm. Electrolysis occurring within the catholyte chamber of the cell unit 9 results in the evolution of hydrogen gas which rises in the chamber of the cell unit to gas space 28. A similar gas space 28-a is formed by the wall 44 attached to the cathode screen 11 of the housing 1. Hydrogen is removed from the system by applying a vacuum through a hydrogen outlet 8 located at the bottom of the box and in communication with the gas space 51 (FIG. 1). Gas space 51 is formed in the bottom of the container 1 and has in communication therewith all of the outlets 29 of the cell units 9 located within the box. A similar outlet for hydrogen is located in the bottom of the catholyte compartment formed by the cathode 11 of the cell housing 1. A slight vacuum is applied to the hydrogen outlet 8 of the housing and hydrogen gas is drawn from chambers 28 and 28-a through passages 27, outlets 29 and gas space 51 to the exterior of the housing. A completely electrolized cell liquor then percolates through openings 18 into passage 19 located at the bottom of cell units 9. Liquor in passage 19 flows through an opening 20 to appropriate collection points not shown but located within the cell housing 1 in the bottom thereof or at some point on the exterior of the box.

Figure 7:
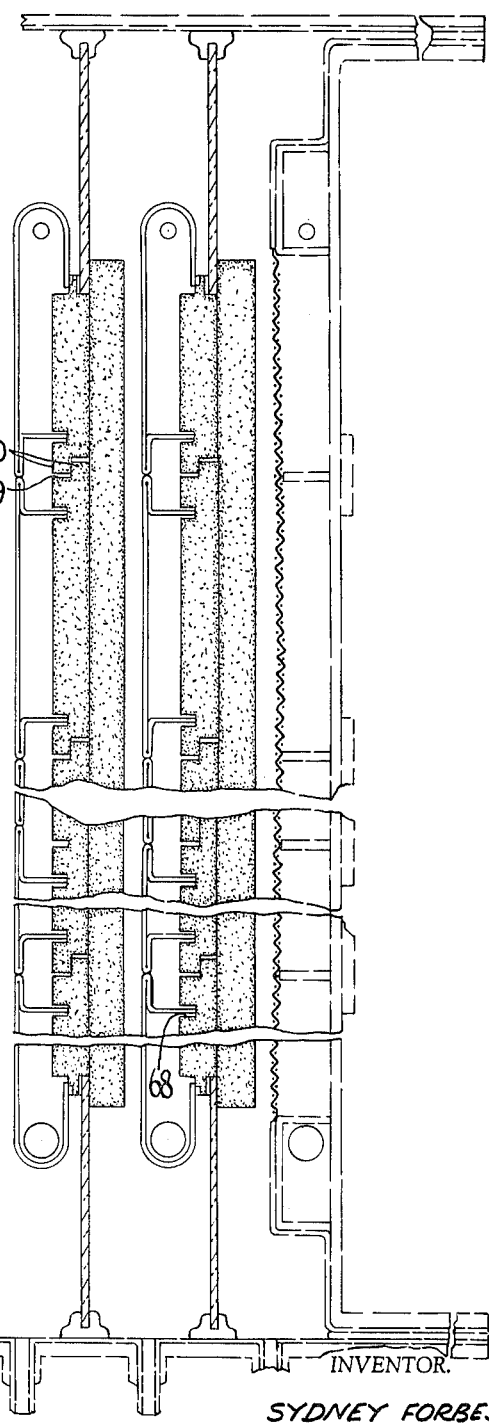
FIG. 7 is a top view of the cell assembly of FIG. 6 with the cover removed to show the cathode screen of the cell assembly and the positioning of the cell units within the housing.

Reference is now made to FIGURES 6 and 7 which illustrate another embodiment of the present invention having a more simplified construction of cell units located within the housing 1. In FIGURE 6, a cell housing generally indicated as 61 has placed therein a plurality of cell units generally designated 62. The cell housing 61 has a consumable graphite anode 63 attached to one wall 64 of the housing with the active surface 63-a of the anode presenting a flat horizontal or rectangular surface which is paralleled with the cathode screen surface 65 of the first cell unit positioned within the housing 61. Cathode screen 65 is a rectangular or square shaped metal screen preferably constructed of steel which is attached at each end to a graphite backing plate 66. Attached to the graphite backing plate 66 is a consumable graphite 67, the connection between the backing plate 66 and the consumable graphite 67 being made by electrically conductive plugs 67-a preferably graphite plugs. As is readily seen from an examination of FIG. 6, the cathode screen 65 is fashioned with two U-bends at either extremity thereof and the sides of the cathode screen are bent inwardly and downwardly so that the sides of the cathode screen are insertable into longitudinal slots 68, FIG. 7, fashioned in the graphite backing plate 66. By bending the cathode screen in this manner and forming eutectic metal seals within the slots at the end section of the cathode screen, a catholyte compartment is formed by the contour of the cathode screen and the surface of the backing plate 66. Graphite backing plates 66 are fashioned at their extremities along their horizontal axis with slots 69 and projections 70 which permit the shiplapping of the backing plates 66 to provide a straight alignment of the cathode screens across the housing 1.

The cell units 62 located within the housing are held in alignment by providing a suitable slotted structural support member 71-a within the box. Support 71-a may be located in the position shown in FIG. 6 or if desired may be fashioned directly into the cover member 61 of the cell housing. A plurality of non-conducting structural support members 71 are located between the cell units and the support members 71-a and serve to divide the cell units into several individual anolyte compartments. The spacers 71 may be constructed of any non-corrosive, non-conductive material, such as glass, resins, rubber-lined steel and other similar materials. The cathode screen 72 of the cell housing 61 is located on the side of the cell housing opposite the side containing the anode member 63. The cathode screens 65 of the cell units are rigidly supported at the bottom of the cell housing by abutting them against gaskets 73. Between the cathode screen 65 and the anode 67 of each cell unit at the bottom are located spacers 74 which like 71 are constructed of suitable non-conducting structural materials.

Caustic outlets 76 are located in the bottom of the cathode screen 65 for the collection of cell liquor. A similar outlet 77 is positioned on the bottom of the catholyte compartment formed by the cathode 72 of the cell assembly 61. Gases such as hydrogen produced within the catholyte compartment rise to a gas space 75 in the top of the catholyte chamber and are removed from the cell at the bottom through an outlet 78. The passage of the gas from space 75 through 78 is accomplished by establishing a pressure differential between the cell units and the exterior of the housing through a hydrogen outlet 79 (FIG. 10) located on the exterior of the box 61. The gases travel from the gas space 75 down the side of the last cell unit in the series across the width of the housing 61. The electrical connection to the cell housing 61 is accomplished through a vertical copper rod 81 which is imbedded in a graphite bar 80. In FIG. 6 the graphite bar 80 is connected to the backing plate 82 of the cell housing anode 63. The current distribution through the cell housing 61 is accomplished by passing current through the copper rod 81, graphite bar 80, to the backing plate 82, from the backing plate 82 to the graphite anode 63. Current then passes through the electrolyte contained between the anode face 63-a and the cathode screen 65 of the first cell unit positioned within the box. From the screen 65 current is conducted to the backing plate 66 of the graphite anode 67 of the first cell unit and is passed across the cell from this unit to the next in line in the above described manner. The current leaves the cell housing 61 through cathode screen 72 which is electrically connected to a copper bus bar 83 located on the exterior of the housing 61.

Figure 8:
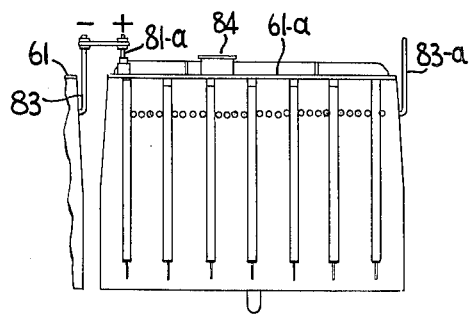
FIG. 8 is a side elevation of the cell assembly of FIG. 6 showing its electrical connection to an adjacent cell

In FIG. 8, there is illustrated the ease with which electrical connections can be made between adjacent cell housings. Thus, in FIG. 8, current is conducted from cell housing 61 to cell housing 61-a through copper bus bar 83 located on the external surface of the housing 61 to the copper bar 81-a of the next adjacent cell housing. Current from cell housing 61-a is conducted to the next adjacent cell housing (not shown) through copper bus 83-a located on one side of the cell housing 61-a. Also shown in FIG. 8 is a common chlorine outlet 84 located on the top of the cell housing 61-a. As will be apparent, chlorine produced at the anode surfaces during operation of a cell from the type shown in FIGURES 6 and 7 will rise in the box to a gas space 85 located below the surface of the cover of the cell housing.

Figure 9:
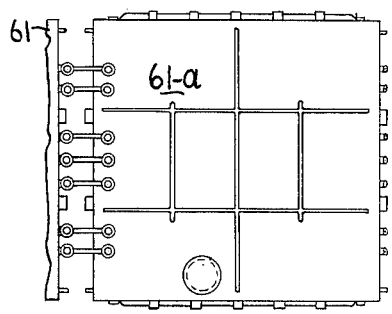
FIG. 9 is a plan view of the cell assembly of FIG. 6 showing the connection between the anodes of adjacent cell assemblies.
Figure 10:
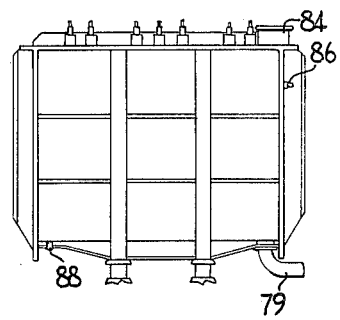
FIG. 10 is an end view of the cell assembly of FIG. 6 with the copper connections shown and showing the hydrogen outlet, cell liquor outlet, chlorine outlet, and the brine feed inlet.

FIG. 9 illustrates the simplicity of the connections between the anodes of adjacent cell assemblies 61 and 61-a permitted by this novel cell construction. FIG. 10 illustrates the means for collecting the various products produced within the cell housing 61 and the external surface of the cell housing. Thus, there is shown in FIG. 10, chlorine outlet 84, brine inlet 86, hydrogen outlet 79, and the cell liquor outlet 88.

Figure 11:
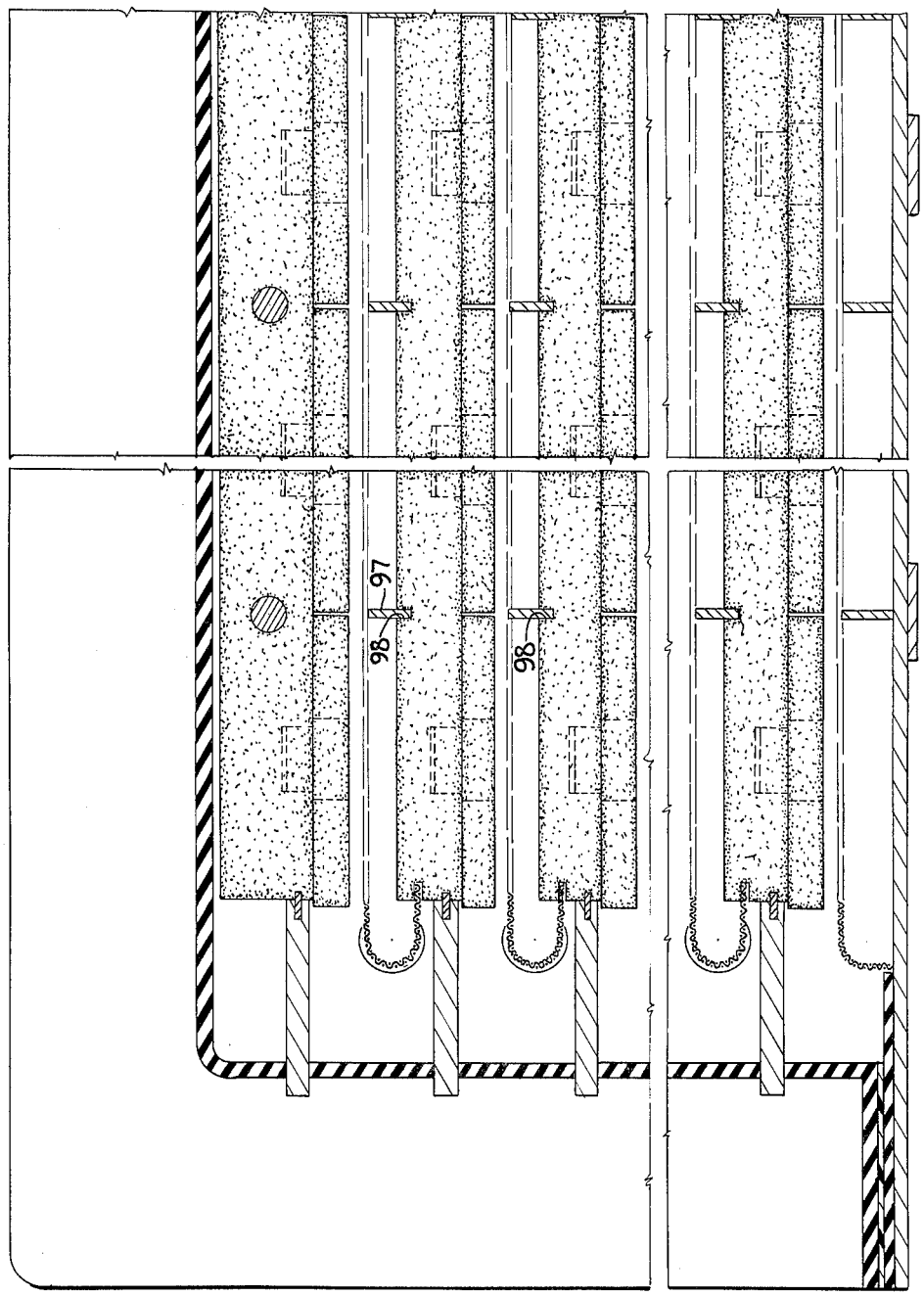

FIGURES 11 and 12 illustrate a further embodiment of the instant invention and describe and show in detail an alternative construction of a cathode screen utilized in the novel cell assembly hereinabove described. Turning to FIG. 12, there is shown a cell housing 91 having located therein a plurality of cell units generally indicated as 92. Cell units 92 are comprised of a solid piece of conducting, non-corrosive material such as graphite, plate 93. Affixed and electrically connected to the outer face of graphite plate 93 are consumable anodes 94. Graphite plates 93 are slotted at 95 to receive the terminal ends of a cathode screen 96. Affixed to the internal surface of the cathode screen 96 are flat electrically conductive metal plates 97 which are welded to the cathode screen 96 and inserted into slots 98 which are provided along the longitudinal axis of the internal surface of the graphite backing plate 93. Cell units 92 constructed in this manner provide a continuous cathode screen across the cell assembly or cell housing 91 since a single screen is utilized to form the catholyte compartment of the individual cell units 92. Support members 99 are located on the bottom of the housing 91 and are grooved slabs of electrically non-conductive material such as concrete, marble and the like. Preferably in resting the cathode screen 96 on the support member 99 a Teflon gasket or another similar gasket which is corrosion resistant and non-conductive is employed. Located in the bottom of the cathode screens are suitable openings (not shown) which communicate through supports 99 with hydrogen and caustic outlets 100 and 101, respectively. In FIG. 12, caustic and hydrogen outlets are shown on the same side of the cell. It will be understood that for each individual cell unit a caustic outlet may be located on one side of the cell unit and a chlorine outlet located on the other side. Since hydrogen during operation will collect at the top of the catholyte compartment 111 of the cell unit 92, it is preferable to insert a tubular conduit through the hydrogen outlet 100 to the gas space at the top of the cell unit 92. Application of a slight vacuum on the hydrogen outlet will effectively remove hydrogen as it is collected in this gas space. To complete the cell assembly, there is located on one side of the housing 91 an electrically conductive backing plate 102 to which is attached graphite anode 103. On the other side of the cell housing 91 is positioned a cathode screen 104 which is attached to a wall of the cell housing and a diaphragm is positioned on the cathode screen 104 as well as on the cathode screen 96 of the cell unit 92. Backing plate 102 is fed current through a copper rod 105 and graphite rod 106 electrically connected thereto. Current is removed from the cell through bus bar 107 electrically connected to the cathode 104 and located on the external surface of the box or housing.

Looking particularly at FIG. 12, there is shown a gas space 108 located above the individual cell units 92. Located underneath the cover member of the cell housing 91 is a corrosion resistant tubular conduit 109 which constitutes the chlorine outlet of the cell. As can be seen, a cell assembly such as 91 is positioned adjacent similar assemblies 91–a and 91–b and communicates therewith through conduits 109 and 109–a. In this manner a plurality of cell assemblies or housings 91 may be placed side by side and a common chlorine conduit from the cell room established between the cell assemblies, thus eliminating the necessity for extensive external or overhead chlorine tubing within the cell room proper.

Metal stiffening members 97 shown more clearly in FIG. 11 are supplied to provide adequate strength and support for the cathode screens of the units and hold them in a rigid, flat position. The stiffeners space the screens a uniform distance along their entire longitudinal surface from the flat inner surface of the graphite backing plate 98 and also serve to conduct current from the cathode to the anode of the next adjacent cell unit since the stiffeners are constructed of electrically conductive material.

The operation of the cell shown in FIGURES 11 and 12 is essentially the same as the operation of the cell of FIGURES 1, 2, 3, and 4. Thus, brine is fed to the anolyte compartment 110 of the cell units. The cell is energized by applying an electrical potential across the cell through the anode 105 and the cathodic bus bar 107. Current is passed through the cell in a straight line from anode face to cathode face beginning with the anode of the cell housing 91 and ending with the cathode face of the cell housing 101, current being conducted from cathode to anode face across the cell units 92 as it passes from the anode face 103 to the cathode face 104 within the housing 91. Chlorine is evolved during electrolysis at the anode faces 103 of the cell housing and at the anode faces 94 of the cell units 92 and rises in the anolyte compartment to the gas space 108 located above the cell units 92. Liquor percolates through the diaphragm located on the cathode screens 96 and 104, respectively, and is subjected to further electrolysis within the catholyte compartments of the cell units and the catholyte compartment formed by cathode 104. Hydrogen liberated at the cathodes is collected in gas space 111 of the cell units 92 and gas space 112 of the cathode compartment formed by cathode 104 of the cell housing. Caustic soda produced during electrolysis of the brine is collected in the bottom collection space 113 of the cell units 92 and is conducted from the cell through a suitable outlet 101. A similar outlet not shown is used to collect caustic soda from the anolyte compartment formed by the cathode screen of the first cell unit 92 and the anode face 103 of the cell housing anode.

As will be readily seen from the drawings, construction of this type permits for the major portion of the cathode surface of the cell units 92 to be spaced equally distant from the internal surface of the backing plates 93 as well as from the external surface of the consumable graphite anode 94. Provision for the maintenance of this equidistant, spaced relationship between the active cathode face of a cell unit and the consumable anode face of an adjacent cell unit as well as the equidistant spacing of cathodes from the internal surface of the backing plate employed provides a minimum mean current path through the cell units as well as the completed cell assembly. Thus, by providing equidistant realtionships between these surfaces and providing a plurality of cell units having identical equidistant spacings, a short mean current path between all anodes and cathodes contained within the housing 91 is permissible.

Cell units of the type hereinabove described present many distinct advantages over prior diaphragm type electrolytic cells as will be readily apparent to one skilled in the art. Thus, as can be readily seen, the mean current path through a diaphragm type electrolytic cell constructed in accordance with the teachings of this invention is extremely small. Resistance to flow of current through the cell is at a minimum permitting operation at high current density and low circuit amperage. In addition, the extreme simplicity of bus connections on the outer walls of the housings employed contribute considerably to the reduction in cost of electrical equipment when operating housings and cell assemblies of the type shown in series. A substantial saving is also accomplished in the space required to produce a given amount of product under a given set of conditions over what would be required in a conventional diaphragm type electrolytic cell, due to the flat pancake design of the cell and the parallel, flat, uniformly spaced relationship of the anodes and the cathodes located within the cell assembly. In addition, the construction of the cell units disposed within the housing of a cell assembly are such that danger of misalignment of cathodes and anode cells having increased capacities for both current and production are reduced to a minimum.

While the invention has been described with reference to certain specific examples and illustrated embodiments, it is of course understood that many modifications may be employed without departing from the spirit of the invention. Thus, for example, in lieu of graphite anodes illustrated in the drawings, noble metal plated base metals may be conveniently utilized. Thus, platinum plated titanium anodes, platinum plated tantalum anodes, gold plated titanium anodes and other similar metal structures may be used. In lieu of graphite backing plates, structural metals such as steel and copper and various electrically conductive alloys may be employed provided they are protected by suitable covering from electrolyte attack or corrosion.

While in the drawing box-like housings are shown, it is of course understood that other modifications may be employed to produce a unitary housing. Thus, the cell units themselves may be mounted on frames and the frames joined together in the manner of a filter press thereby providing the housing. In this case one frame on either end of the housing would carry a half of a cell unit, one being an anode and the other a cathode.

This, it is to be understood that the invention is not to be limited by the specific examples and illustrated embodiments except insofar as appears in the accompanying claims.

I claim:

1. An electrolytic cell which comprises a cell housing having walls for enclosing an electrolyte, one of said walls having positioned thereon a substantially flat cell anode, another of said walls having positioned thereon a foraminous metal cell cathode having a flat active surface directly opposite and parallel to said cell anode, a fibrous diaphragm positioned on said flat active surface of said cell cathode, a cell unit in said cell housing, said unit comprising an electrically conductive backing plate impermeable to cell electrolyte and parallel to said cell cathode, an electrically conductive side wall directly opposite said backing plate, said electrically conductive side will being readily permeable to cell electrolyte and having an outer cathodic surface with a diaphragm positioned thereon, a plurality of elongated electrically conductive metal stiffeners positioned between and electrically connected to said backing plate and said electrically conductive side wall of said unit, said stiffeners being parallel to said cell anode and cell cathode, a cell unit anode positioned on said backing plate on the outer surface and contiguous with the entire outer surface thereof and in electrical contract therewith, said stiffeners being parallel to said cell unit anode and said cathodic surface to thereby distribute current from the cathodic surface to the cell unit anode, said unit being disposed in the cell housing to position the cell unit anode thereof parallel to said cathode of the cell housing and the cathodic surface thereof parallel to the anode of the cell housing, product discharge means in said unit, product discharge means and electrolyte introduction means in said cell, and means for establishing a potential between the anode and the cathode of said cell housing.

2. An electrolytic cell comprising a cell housing having walls for enclosing an electrolyte, one of said walls having positioned thereon a substantially flat cell anode, another of said walls having positioned thereon a foraminous metal cell cathode having a flat active surface directly opposite and parallel to said cell anode and having thereon a fibrous diaphragm, a cell unit in said cell housing, said unit comprising an electrically conductive backing plate impermeable to cell electrolyte and parallel to said cell cathode, and having at least two elongated slots positioned near the edges of said backing plate along the long axis thereof for a substantial distance, a foraminous cell unit cathode attached to said backing plate at the top, the bottom and the sides thereby forming a chamber, said foraminous cell unit cathode having side portions secured in said slots to thereby provide direct electrical communication between said foraminous cell unit cathode and said backing plate along the long axis of both, a fibrous diaphragm positioned on said foraminous cell unit cathode on the outer surface thereof, a cell unit anode positioned on said backing plate on the outer surface thereof and contiguous with the entire outer surface thereof and in electrical contact therewith, means in said chamber for conducting product from said chamber to a point outside said chamber and means for supplying current to said cell anode and said cell cathode.

3. A cell unit comprising an electrically conductive backing plate impermeable to cell electrolyte, two elongated slots positioned near the edges of said backing plate and extending along the long axis of said backing plate a substantial distance, a foraminous, substantially flat cell unit cathode attached to said backing plate at the top, the bottom and sides thereof thereby forming a chamber, said foraminous cell unit cathode having side portions secured in said slots to thereby provide direct electrical communication between said foraminous cell unit cathode and said backing plate, a fibrous diaphragm positioned on said cell unit cathode on the outer surface thereof, a substantially flat cell unit anode positioned on said backing plate and contiguous with the entire outer surface thereof and in electrical contact therewith, means in said chamber for conducting products from said chamber to a point outside of said chamber.

4. An electrolytic cell assembly comprising a cell housing having walls for enclosing an electrolyte, one of said walls having positioned thereon a substantially flat cell anode parallel to said wall, another of said walls having positioned thereon a foraminous metal cell cathode having a substantially flat active surface which is parallel to said cell anode and contains thereon a fibrous diaphragm, a cell unit in said cell housing, said cell unit comprising an enclosed chamber having a side wall essentially impermeable to cell electrolyte and having affixed thereto an outer flat active cell unit anode contiguous with said side wall along its entire area, a second side wall of said chamber directly opposite the first side wall, said second wall being readily permeable to cell electrolyte and having an outer cathodic surface, the cell unit anode and cathodic surfaces of said cell unit being positioned parallel with respect to each other and connected electrically to each other by a plurality of elongated metal plates positioned between said first and said second side walls along their long axis, said cell unit being positioned in said cell housing so that the cell unit anode thereof is parallel to the cell cathode and the cathodic surface thereof is parallel to the cell anode, means for withdrawing liquid product from the cell housing, a gas collection chamber located beneath the cover of said cell housing and the upper surface of said cell unit, and means for connecting said chamber to a similar chamber in an adjacent cell assembly.

References Cited by the Examiner

UNITED STATES PATENTS

| | | | |
|---|---|---|---|
| 1,053,266 | 2/1913 | Barstow | 204—256 X |
| 1,365,875 | 1/1921 | Ward | 204—256 |
| 1,866,065 | 7/1932 | Stuart | 204—258 X |
| 2,384,463 | 9/1945 | Gunn et al. | 204—256 |
| 2,858,263 | 10/1958 | Lucas et al. | 204—256 |
| 2,920,028 | 1/1960 | Forbes | 204—253 |

JOHN H. MACK, *Primary Examiner.*